United States Patent
Pieper

[11] Patent Number: 5,439,496
[45] Date of Patent: Aug. 8, 1995

[54] METHOD FOR THE VITRIFICATION OF WASTE MATERIALS AND APPARATUS TO CARRY OUT THE METHOD

[75] Inventor: Helmut Pieper, Lohr am Main, Germany

[73] Assignee: Beteiligungen Sorg G, bh & Co. KG, Lohr am Main, Germany

[21] Appl. No.: 183,701

[22] Filed: Jan. 19, 1994

[30] Foreign Application Priority Data

Jan. 20, 1993 [DE] Germany .................. 43 01 353.8

[51] Int. Cl.6 .................. C03B 3/02; C03B 5/02; C03B 5/16
[52] U.S. Cl. .................. 65/27; 65/134.6; 65/135.6; 65/136.1; 65/335; 373/34
[58] Field of Search .................. 65/27, 134.6, 135.6, 65/136.1, 335; 373/34

[56] References Cited

U.S. PATENT DOCUMENTS

| | | | |
|---|---|---|---|
| 1,610,376 | 12/1926 | Hitner | 373/34 |
| 3,607,190 | 9/1971 | Penberthy | 65/335 |
| 4,248,615 | 2/1981 | Seng et al. | 65/27 |
| 4,328,019 | 5/1982 | Dejaiffe et al. | 65/27 |
| 4,944,785 | 7/1990 | Sorg et al. | 65/134.6 |
| 5,032,161 | 7/1991 | Pieper et al. | 65/335 |

Primary Examiner—Karen M. Hastings
Assistant Examiner—Steven P. Griffin

[57] ABSTRACT

A method and apparatus for vitrifying waste materials containing a high quantity of carbon are provided which include the use of a secondary combustion chamber for burning the waste gases resulting from an electrically heated glass melting furnace. Additional energy is generated by this afterburning which is used to preheat batch materials used in the glass melting furnace. The particulate matter in the burned waste gases is collected in a gas washer as sludge, is thickened, and is fed back to the glass melting furnace.

13 Claims, 2 Drawing Sheets

METHOD FOR THE VITRIFICATION OF WASTE MATERIALS AND APPARATUS TO CARRY OUT THE METHOD

BACKGROUND OF THE INVENTION

The invention concerns a method for the vitrification of waste materials, and more particularly for waste materials which contain high quantities of carbon, in an electrically heated glass melting furnace, whereby the waste gases from the glass melting furnace are subjected to secondary combustion.

Methods of this type are already known, whereby according to U.S. Pat. No. 4,944,785, owned by the assignee of the present application, dust and sludge produced by waste gas cleaning during the vitrification of waste materials are returned to the process by being mixed into the batch.

This method may result in problems with the recycling of the dust and sludge if the waste material which is to be vitrified contains large amounts of carbon. When ashes with a high carbon content are melted, a fluid layer can be formed on the surface of the electrically heated glass melt, which results in a high level of dust emission with the waste gases.

In addition, the apparatus used to carry out the method is not suitable for continuous, trouble-free operation and it is difficult to use all the energy from the waste gases, and to achieve complete cleaning thereof.

The German published application DE-OS 38 41 889 describes a method of converting solid, virtually water-free waste materials into glass, whereby the waste materials are mixed with one or more additional materials to form a batch to be melted, whereby the main part of the batch is melted to glass by the application of heat, and a small part is led off in the form of waste gases emitted from the melting batch, whereby solid glass bodies are produced from the glass melt by casting and cooling, whereby ash from the incineration of refuse is used as the waste product, whereby the hot waste gases are drawn off without contact with the surrounding air and are returned to the batch and cooled to a temperature between 20° C. and 50° C., whereby the condensation products formed during cooling are melted with the batch and whereby the cold waste gases which emanate from the batch are subjected to one of the state of the art waste gas cleaning processes.

The apparatus for carrying out the method according to German published application DE-OS 38 41 889 is characterized by an enclosed batch mixer with an inlet for solid materials through which the ash from waste incineration and the additional materials are fed for mixing, with an outlet for the finished batch which is ready for melting, and with a gas inlet and gas outlet, by an enclosed glass melting furnace with a batch charger at one end of the furnace, which is connected to the solid material outlet of the batch mixer, with at least one waste gas flue opening, and with an outlet for the molten glass at the other end of the furnace, and by a gas cleaning device, the entry of which is connected to the gas outlet of the batch mixer.

A disadvantage of this method, and the disclosed apparatus, is that it is not suitable for waste materials which contain large amounts of carbon, as no afterburning is provided, and as the waste gas energy is not fully exploited.

SUMMARY OF THE INVENTION

An object of the present invention is to provide a process for vitrifying waste materials, which may also contain higher levels of carbon, in which the energy from the waste gases is exploited completely by afterburning, in which only small quantities of waste gases are produced, the waste gases being cleaned completely, and for which a limited amount of equipment is required for trouble-free, continuous operation.

Furthermore, it should be possible for unskilled personnel to operate the relevant equipment.

This object is achieved by the method initially referred to above in that the waste gases from the afterburning are passed to a pre-heater for heating up the batch components, in which the waste gases are cooled by cold air, in that part of the air warmed in the batch preheater, which leaves the preheater at a temperature within the range of 150° C.–400° C., preferably approximately 200° C., is passed to the afterburner, and in that the waste gases are then passed to a gas washer and then to the final cleaning.

Other advantageous embodiments of the method according to the invention are detailed below.

The apparatus for carrying out the method of the invention comprises a gas washer, at least one active charcoal filter and a batch preheater which preferably includes hollow bodies angled downwards and inwards, the hollow bodies acting as baffles for the material, and through which air flows, whereby the air has a temperature between 150° C. and 400° C., most commonly approximately 200° C., when it leaves the preheater.

As the method according to the invention and the apparatus according to the invention solve the difficult problem of processing waste materials containing carbon for the first time, it is to be expected that their application will lead to a significant reduction in the environmental pollution caused by waste materials, especially since the waste gases are not greatly increased by quenching, as normally happens.

BRIEF DESCRIPTION OF THE DRAWINGS

An example of the method according to the invention and the apparatus according to the invention is described below with reference to drawings. Shown are.

DETAILED DESCRIPTION OF THE PREFERRED EMBODIMENTS

Figure 1:
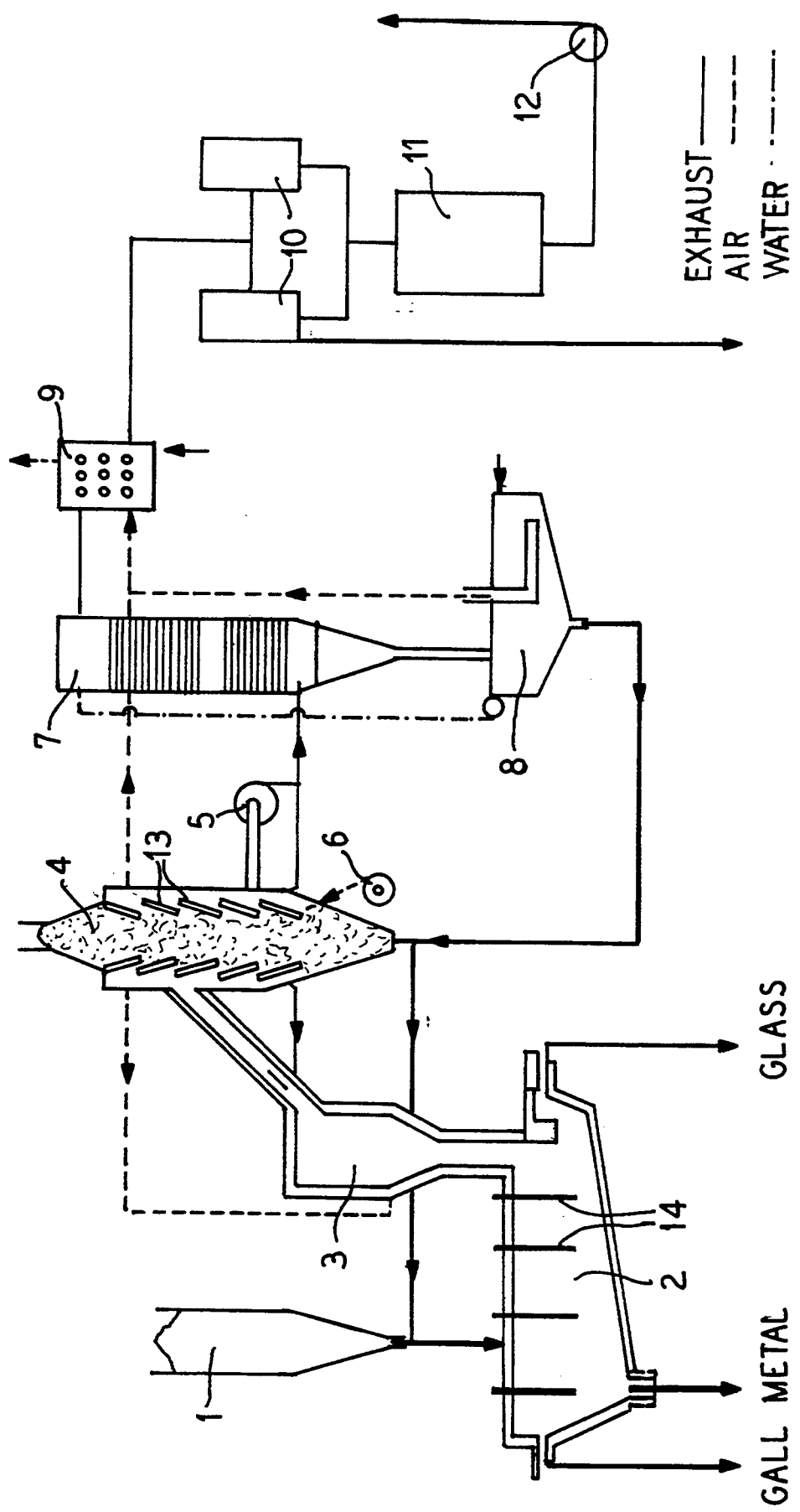
FIG. 1 is a schematic flow diagram of the method and apparatus of the invention.
Figure 2:
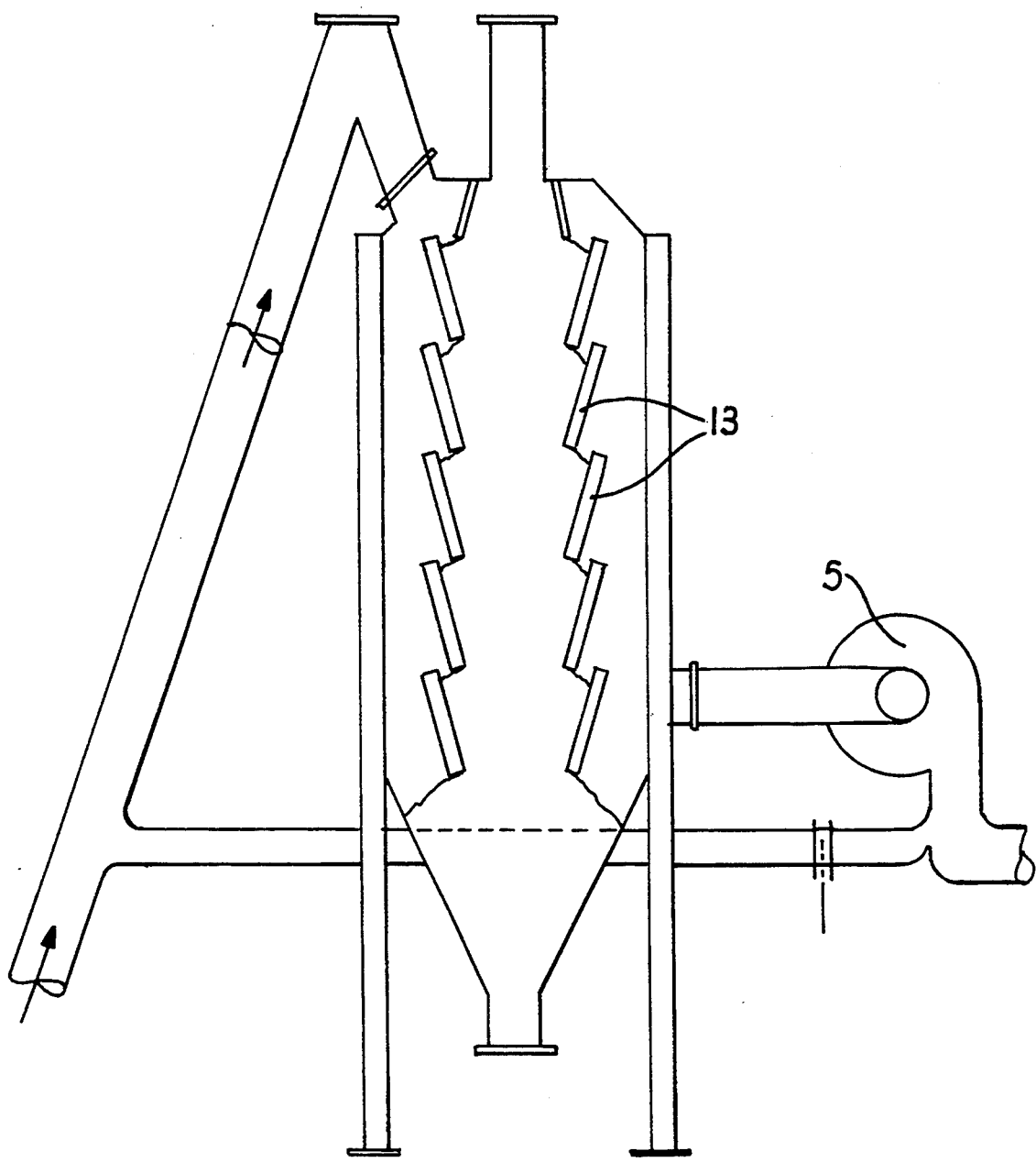
FIG. 2 is a cross section through a batch pre-heater according to the principles of the invention.

The problems described are solved by the use of a piece of equipment which combines a heat exchanger, condenser and hot gas filter. Hereafter this item is referred to as a batch pre-heater 4.

This equipment is installed after and directly adjacent to the afterburning or secondary combustion chamber 3 and is designed according to the same principles as the hot gas filter described in the German published application OS 36 26 076 of the applicant (U.S. Pat. No. 4,797,092), whereby the lateral guide plates consist of hollow bodies, through which a cooling medium, e.g. air, flows. The waste gases do in fact condense on the cold surfaces, but these surfaces are continuously cleaned, at least on the inside, by the material flowing from the top, which consists of the additional materials, such as sand, phonolite or glass cullet.

The waste gases are sucked out of the pre-heater 4 by a hot gas exhauster 5 and the waste gas temperature after the pre-heater is maintained above the individual acid dew points of the waste gases, otherwise significant corrosion damage would occur to the batch pre-heater. This is achieved by adjustment of the cooling air quantity. Furthermore a proportion of the cooled waste gases is removed after the batch pre-heater 4 and fed back into the hot waste gas flow before the batch pre-heater, so that the inlet temperature of the batch pre-heater is limited without increasing the total amount of waste gases in the system.

The pre-heated air produced in the batch pre-heater 4 is used at three locations in the process. A part is used as combustion air in the secondary combustion chamber 3 (as shown by line 20) in order to ensure good and complete combustion of the CO.

A second part (as indicated by return line 22) is used to create a washing process free of waste water, in that the sludge from the gas washer 7 is thickened in a thickener 8 so that it can be returned to the furnace.

The third part of the heated air is taken to a heat exchanger 9 (as shown by line 24), in order to bring the cooled waste gases after the gas washer 7 up to a temperature of approximately 80° C. It is then possible to pass the waste gases through the selectable active charcoal filters 10 at a suitable temperature.

The glass melting furnace used is already known from previously published applications of the applicant such as U.S. Pat. No. 4,944,785 incorporated herein by reference. The electrodes 14 are submerged in the melt from above, whereby both the glass and the gall layer floating on the glass are removed by means of overflows 26, 28.

A discontinuously operating drain 30 for metals is situated in the deepest part of the furnace.

The batch is fed in from a batch silo 1, whereby the batch fed into the furnace is enriched by the pre-heated batch from the pre-heater 4 through conduit 32 and by the sludge from the thickener 8 of the gas washer 7 through conduit 34.

The secondary combustion chamber 3 is situated near to the glass removal point 26 of the furnace 2, in which temperatures can reach approximately 1000° C., and in which CO is converted into $CO_2$, and any dioxine and furane present are certainly destroyed.

Cooled waste gases are blown into a pipe 36 between the secondary combustion chamber 3 and the pre-heater 4 by fan 5 through conduit 38, whereby the temperature is reduced to approximately 600° C., so that no overheating of the pre-heater 4 can occur.

Cooling air flows through the hollow bodies 13. This air is sucked in by a fresh air fan 6 and flows through the chambers either one after another or in parallel.

The heated air has a temperature of 200° C. when it leaves the pre-heater, and, as described above, it is divided into three parts (on lines 20, 22 and 24). The gas washer 7, the thickener 8 and the heat exchanger 9 conform to state-of-the-art technology and therefore do not need to be described in more detail. The same applies to the selectable active charcoal filters 10, the common active charcoal filter 11, and the clean gas fan 12.

For the sake of clarity the waste gas streams, the air streams and the water stream of the thickener 8 are shown separately.

Lumps of burnt lime can be added to the material in the pre-heater to absorb chlorine and sulphur, whereby part of these materials is fed directly into the furnace. Therefore under certain conditions the gas washer 7 can be omitted.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A method for the vitrification of waste materials, which contain high quantities of carbon, in an electrically heated glass melting furnace, comprising the steps of:
    subjecting waste gases from the glass melting furnace to secondary combustion in a secondary combustion chamber to convert CO into $CO_2$,
    using waste gases from said secondary combustion to heat batch components in a batch pre-heater,
    cooling said secondary combustion waste gases by relatively cold air thereby raising a temperature of said air to a temperature between 150° C. and 400° C. at an outlet of said batch pre-heater,
    passing a part of said raised temperature air to said secondary combustion chamber, and
    cleaning said cooled waste gases prior to releasing them to the atmosphere.

2. A method according to claim 1, wherein said air is raised to a temperature of approximately 200° C. at said outlet of said batch pre-heater.

3. A method according to claim 1, wherein said cleaning of said cooled waste gases includes washing and filtering of said waste gases.

4. A method according to claim 1, wherein a further part of said raised temperature air is passed to a heat exchanger, in which said raised temperature air is used to heat said cooled waste gases to a suitable temperature for said cleaning of said waste gases in an active charcoal filter.

5. A method according to claim 1, wherein cleaning of said cooled waste gases occurs in a gas washer wherein a sludge is formed from said cleaned gases and a further part of said raised temperature air is passed into said sludge in order to thicken said sludge to a consistency which can be fed into said glass melting furnace.

6. A method according to claim 1, including adding burnt lime in lumps to said batch components in said batch pre-heater.

7. An apparatus for vitrifying waste materials containing a high quantity of carbon comprising:
    an electrically heated glass melting furnace;
    a secondary combustion chamber for the combustion of waste gases from said glass melting furnace to convert CO to $CO_2$;
    a batch pre-heater for receiving batch materials to be fed into said glass melting furnace;
    conduit means for directing said waste gases from said secondary combustion chamber to said batch pre-heater;
    conduit means for directing relatively cold air into said batch pre-heater to raise a temperature of said air to between 150° C. and 400° C. at an outlet of said batch pre-heater;

conduit means for directing a part of said raised temperature air to said secondary combustion chamber; and a gas cleaning means associated with said batch pre-heater for cleaning waste gases prior to releasing them to the atmosphere.

8. An apparatus according to claim 7, wherein said batch pre-heater has hollow bodies therein, slanted downwards and inwards, which act as baffles for said batch materials, said relatively cold air being directed from said conduit means for directing relatively cold air into said batch pre-heater through said hollow bodies to absorb heat from said waste gases.

9. An apparatus according to claim 7, wherein said gas cleaning means comprises an active charcoal filter and additional conduit means are provided for directing a part of said raised temperature air to a heat exchanger in which said raised temperature air is used to heat said waste gases to a suitable temperature for said cleaning of said waste gases in said active charcoal filter.

10. An apparatus according to claim 7, wherein said gas cleaning means comprises lumps of burnt lime added to said batch materials in said batch pre-heater.

11. An apparatus according to claim 7, wherein said gas cleaning means comprises a gas washer connected by conduit to said batch pre-heater to receive said waste gases from said batch pre-heater.

12. An apparatus according to claim 11, including a sludge thickener connected to said gas washer to receive sludge from said gas washer wherein additional conduit means are provided for directing a part of said raised temperature air into sludge in said sludge thickener in order to thicken said sludge to a consistency which can be fed into said glass melting furnace.

13. An apparatus for vitrifying waste materials, comprising:

a glass melting furnace heated by electrodes;

first conduit means for withdrawing waste gases from said glass melting furnace;

an afterburning chamber supplied by said first conduit means for burning said waste gases;

second conduit means for withdrawing said burned waste gases from said afterburning chamber;

a batch pre-heater for receiving a supply of batch material to be fed to said glass melting furnace;

said second conduit means being connected to said batch pre-heater to supply said burned waste gases to said batch pre-heater to pre-heat said batch material, third conduit means for carrying said pre-heated batch material to said glass melting furnace;

means for supplying cold air to said batch pre-heater to cool said burned waste gases and to heat said air;

fourth conduit means for withdrawing a portion of said cooled burned waste gases and directing it to an inlet of said batch pre-heater;

fifth conduit means for withdrawing a portion of said heated air from said batch pre-heater and directing it to an inlet of said afterburning chamber;

a gas washing device;

sixth conduit means for withdrawing a portion of said cooled burned waste gases and directing it to said gas washing device;

a thickening device connected to said gas washing device to collect sludge therefrom;

seventh conduit means for withdrawing a portion of said heated air from said batch pre-heater and directing it to said thickening device to thicken said sludge;

eighth conduit means for withdrawing thickened sludge from said thickener and carrying it to said glass melting furnace;

a heat exchanger;

ninth conduit means for withdrawing a portion of said cooled burned waste gases from said pre-heater and directing it to said heat exchanger;

tenth conduit means for withdrawing a portion of said heated air from said pre-heater and directing it to said heat exchanger to heat said cooled burned waste gases;

active charcoal filters;

eleventh conduit means for withdrawing said heated, cooled burned waste gases from said heat exchanger and directing them to said charcoal filters;

means for withdrawing said heated cooled burned waste gases from said filters and directing them to atmosphere.

* * * * *

UNITED STATES PATENT AND TRADEMARK OFFICE
CERTIFICATE OF CORRECTION

PATENT NO. : 5,439,496
DATED : August 8, 1995
INVENTOR(S) : Helmut Pieper

It is certified that error appears in the above-indentified patent and that said Letters Patent is hereby corrected as shown below:

On the title page: Item [73]

Assignee should read as follows:

Beteiligungen Sorg GmbH & Co. KG

Signed and Sealed this

Thirteenth Day of February, 1996

Attest:

BRUCE LEHMAN

Attesting Officer

Commissioner of Patents and Trademarks